Nov. 23, 1937.   A. W. HOLMBERG ET AL   2,100,165
FAUCET SPRAY AND STRAINER NOZZLE
Filed May 5, 1936
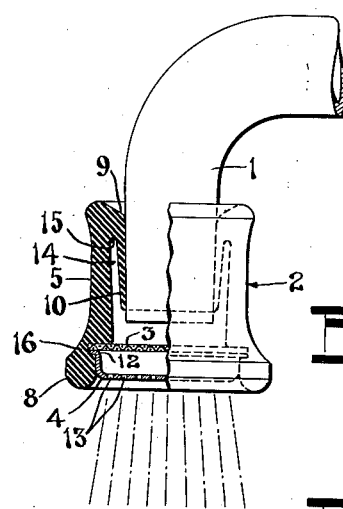
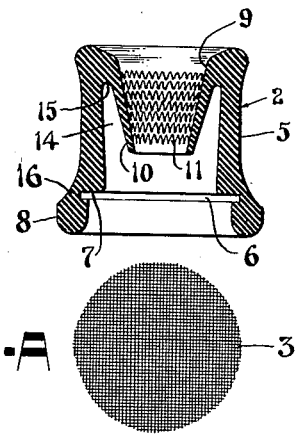
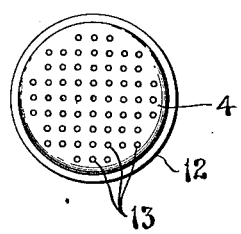
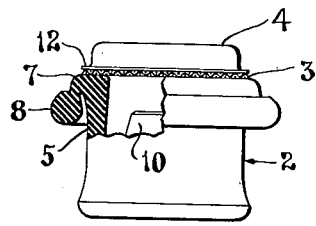
INVENTORS
August W. Holmberg
Centre W. Holmberg
BY
ATTORNEY Patented Nov. 23, 1937

2,100,165

UNITED STATES PATENT OFFICE 2,100,165

FAUCET SPRAY AND STRAINER NOZZLE

August W. Holmberg, Brooklyn, and Centre W. Holmberg, New Rochelle, N. Y.

Application May 5, 1936, Serial No. 77,958

7 Claims. (Cl. 299—141)

Our invention relates generally to nozzles provided with strainers designed for attachment to faucets and more specifically to nozzles for attachment to water faucets and held in position thereon by friction so as to be readily attached to and removed therefrom. It is common in such devices to provide the casing with a rubber bushing whose bore is smaller than the diameter of the faucet spout, but such bushings must be made quite heavy to afford the proper frictional engagement for holding the device in position against the water pressure and to prevent leak due to back pressure. This makes it difficult to apply the device to a faucet or to remove it therefrom for cleaning, and such device is limited for use on faucets of definite size.

In overcoming the objections inherent to such types of nozzles we have devised a nozzle which is adapted for application to a wider range of faucet sizes, and so construct the nozzle with a gripping bead and sealing sleeve to form a pressure chamber within the nozzle wherein the back pressure of the water issuing from the faucet spout acts upon the gripping bead and sleeve to increase the gripping effect on the spout and at the same time insure sealing against leakage between the nozzle and faucet spout. In addition to the usual strainer a perforated plate is provided having holes spaced to cause the water to issue from the nozzle in fine jets instead of a solid column as is the case with the usual fine wire mesh strainers, and which plate provides considerable pressure area and hence effects a back pressure within the nozzle whereby the gripping effect of the nozzle on the faucet spout or tube to which it is attached is greatly increased and leakage prevented.

In carrying our invention into effect we provide a nozzle body preferably made entirely of rubber or freely elastic material or fabric having a thick wall and an internal diameter larger than the external diameter of a faucet spout thereby providing a chamber within the nozzle wall surrounding the spout. The entrance end of this body is provided with an internal bead for gripping the spout and from this bead a sleeve formed integrally therewith extends downward into the nozzle chamber and which sleeve is of smaller bore than the diameter of the faucet spout and quite thin relative to the outer wall of the nozzle so as to be freely expansible and readily compressible when subjected to the back pressure of the water within the nozzle chamber. This sleeve is preferably tapered inward to a diameter smaller than the entrance end of the nozzle and smaller than the diameter of the faucet spout. The body of the nozzle is provided with an internal circumferential groove for receiving the wire mesh strainer and the flange of a dished perforated spray plate, the groove forming a seat for the spray plate and strainer, and both being held firmly in the groove and against the seat by a bead at the exit end of the nozzle body.

The invention is illustrated in the accompanying drawing in which, Figure 1 is a part elevation and vertical section of the nozzle applied to the spout of a faucet; Figures 2, 2ª and 2ᵇ a vertical section and plant of the disassembled parts; and Figure 3 an elevation and partial section showing the strainer and spray plate in position for assembly with the nozzle body and the retaining bead curled back to permit seating of the strainer and spray plate.

Referring to the drawing, 1 indicates the spout of a faucet, 2 the moulded rubber nozzle body, 3 the wire mesh strainer, and 4 the spray plate. The rubber body 2 has a thick wall as shown in section at 5, preferably flaring outward toward the outlet end, or bell-shaped, and its interior substantially cylindrical; a circumferential groove 6 and shoulder 7 forming a seat for the strainer and spray plate; and a retaining bead 8 at the outlet end of the nozzle body for holding the strainer and spray plate to the seat and for sealing the nozzle at the junction with the spray plate. The entrance end of body 2 is thicker than wall 5 and forms an internal bead 9, and this bead is drawn out to form a relatively thin inwardly projecting cone-shaped sleeve 10, the inner end of which is approximately one-half the diameter of the entrance end at the bead 9 as seen in Figure 2. The inner surface of the sleeve may be moulded with a roughened or knurled surface 11 as indicated in Figure 2 to increase its gripping effect on the spout.

It is usual in nozzles of this type to provide one or more disks of fine wire mesh to serve as a strainer. With such strainers the water issues from the nozzle in a substantially solid column at a reduced pressure. In our improved construction the usual strainer 3 is provided, but in addition a spray plate 4 is provided. This plate is preferably in dish form having a seating flange 12 and perforations 13. These perforations are approximately one thirty-second of an inch in size, or less, and approximately one-eighth inch between centers, thus presenting a considerably pressure area at the plate, and the water issues from the nozzle in fine separate jets as indicated in Figure 1. The spray plate is preferably dished to provide a spacing between it and the strainer as seen in Figure 1, and at the same time provides a surface against which bead 8 contacts to make the seal at the spray plate more effective.

By reference to Figure 1 it will be observed that the bead 9 provides the contractile ring section for normally gripping the faucet spout, and it will be understood that this section of the nozzle body owing to the absence of a rigid metallic member will expand more readily in applying the nozzle to the spout, and therefore permits application to a wider range of spout sizes and also permits application of the nozzle to and removal from a spout with less effort and still provide sufficient grip to hold the nozzle firmly in position on the spout. It will also be observed by reference to Figure 1 that when the nozzle is in position on the spout, sleeve 10 is expanded to fit the spout and owing to the taper the sleeve expands progressively to a greater extent towards its inner end, and that therefore the sleeve is initially held to the spout with greater tension at its inner end. It will also be noted that the nozzle body 2 has an internal diameter considerably larger than the diameter of the spout which results in a circumferential space 14 between wall 5 and sleeve 10. It will also be noted that the combined area of the perforations 13 is considerably less than the bore of the spout, i. e., for a one-half inch spout approximately one-quarter the area, thus causing the jets to issue therefrom at considerably increased pressure, and also providing a pressure area over disk 4 which will cause a considerably back pressure of the water within space 14, and since the wall 5 is considerably more resistant than sleeve 10, and since sleeve 10 presents a large surface area, and owing to its thinness being very pliant, the back pressure of the water in space 14 will press the sleeve firmly and closely about the surface of spout 1 throughout its length and regardless of its exterior shape, thereby effecting a perfect seal at the spout preventing leakage, and greatly increasing the gripping effect on the spout. This back pressure also acts upon the inner edge 15 of the bead 9 to increase its gripping effect on the spout, and thus there is provided a long gripping surface extending from the inner end of sleeve 10 to the outer edge of bead 9 whose frictional engagement with the spout increases with the increase in water pressure and thereby prevents the nozzle blowing off the spout. It will also be noted that when the water pressure is turned off the pressure on sleeve 10 and bead 9 will relax, permitting easy removal of the nozzle from the spout.

Another important advantage of this construction is the ease with which the parts may be assembled for use and disassembled for cleaning. This is illustrated in Figure 3 of the drawing. It will be observed that the provision of groove 6 results in a relatively thin wall section 16, Figure 2, which permits bead 8 being rolled over or down when the nozzle is inverted as in Figure 3, and in which position the bead is readily held. When the rubber nozzle body is in this position the strainer mesh 3 is placed on seat 7 and the flange 12 of spray plate 4 is placed on mesh 3, whereupon the bead 8 is allowed to roll back to its normal position as shown in Figure 1. The bead 8 then firmly presses against flange 12 firmly seating the strainer and spray plate, and the inner surface of bead 8 closely hugging the dished part of plate 4 and thereby preventing leakage around the rim of the plate.

It will also be noted that another advantage of our improved construction and particularly the outward flare or bell-shape of the body 2 is that this shape permits the use of a spray plate of large area, thus permitting a large number of spray holes producing a large spray covering an area approximately four times the area covered by a solid column issuing direct from a half-inch spout or through the ordinary strainer nozzle, and the jets issuing through the spray holes will have much greater force, and the back pressure is correspondingly increased to increase the grip on the spout. This makes our improved nozzle much more effective in use. A further advantage in the shape is that it permits the curling or rolling of bead 8 back over the body 2 thereby greatly facilitating the assembling and disassembling of the parts, and making it possible to disassemble and reassemble the parts without removing the nozzle from the faucet spout. Another advantage of our construction is that the size of the outlet end may be of any desired diameter for any desired size of spray plate, and that the gripping bead 9 and sleeve 10 will serve for attaching the nozzle to any tube or hose for any use, since the back pressure obtained is the means for effectively holding the nozzle on the spout or other tube when water issues therefrom, and the elasticity of the nozzle body serving mainly for the initial gripping effect.

What we claim is:

1. In a device of the character described, a nozzle body made wholly of elastic material, having a thick outer wall flaring outward toward the outlet end and cylindrical on the interior and having a shoulder or seat near the outlet end of said body, an internal bead formed at the entrance end of said body, a sleeve formed integral with said bead and projecting downwardly within the body and spaced therefrom, a bead formed at the outlet end of said body of larger inside diameter than the inner cylindrical part of said body, and an internal circumferential groove formed in the wall of said body between said last named bead and seat.

2. In a device of the character described, a nozzle body having a gripping surface at the inlet end for engagement with a faucet or the like, a shoulder formed at the outlet end of the bore of said body, and a bead at the outlet end attached to the body part by a relatively thin elastic wall at the outer periphery of the body, said bead and shoulder forming a retaining groove for a strainer, and said thin wall permitting rolling of the bead back over the body part to permit insertion or removal of the strainer.

3. In a device of the character described, a nozzle body of elastic material, having a thick outer wall, a relatively thin sleeve portion formed integrally with the outer wall and projecting downward within the outer wall and spaced therefrom, a shoulder formed at the outlet end of the bore of said body, and a bead at the discharge end of said body and connected thereto by a relatively thin wall section at the outer periphery of the body part to permit rolling the bead back from the discharge end of the body.

4. In a nozzle of the class described, the combination of a nozzle body as specified in claim 2, and a spray plate seated between the shoulder and bead of the nozzle body.

5. In a nozzle of the class described, the combination of a nozzle body as specified in claim 2, a spray plate, and a mesh screen above said plate and spaced therefrom and both seated between the shoulder and bead of the nozzle body.

6. In a nozzle of the class described, the combination of a nozzle body as specified in claim 2, a spray member in dished form having a laterally projecting flange and widely spaced perforations in the dish bottom, and a mesh screen resting on said flange and spaced from the perforated bottom by the depth of the dish, and said screen and flange being seated between the shoulder and bead of the nozzle body.

7. In a nozzle of the class described, the combination of a nozzle body as specified in claim 3, a spray member in dished form having a flat perforated bottom and a laterally projecting flange, a mesh screen resting on said flange and spaced from the perforated bottom by the depth of the dish, and said screen and flange being seated between the shoulder and bead of the nozzle body.

AUGUST W. HOLMBERG.
CENTRE W. HOLMBERG.